W. H. TRISSLER.
Vegetable Cutter.
No. 28,419. Patented May 22, 1860.
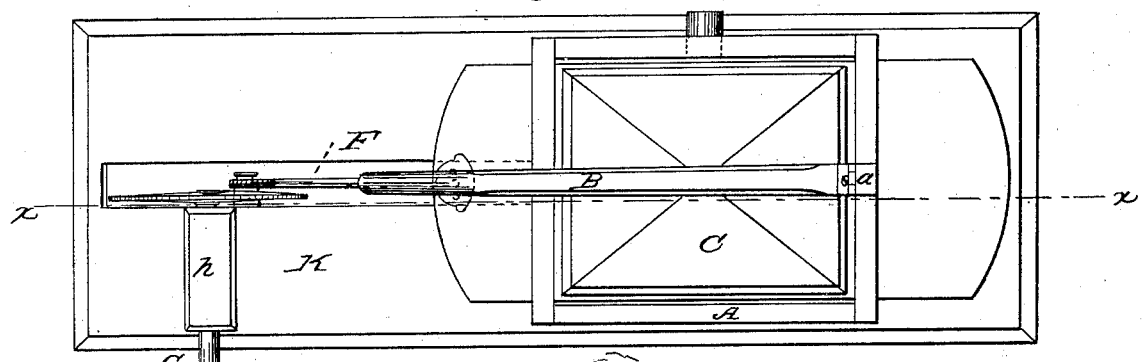
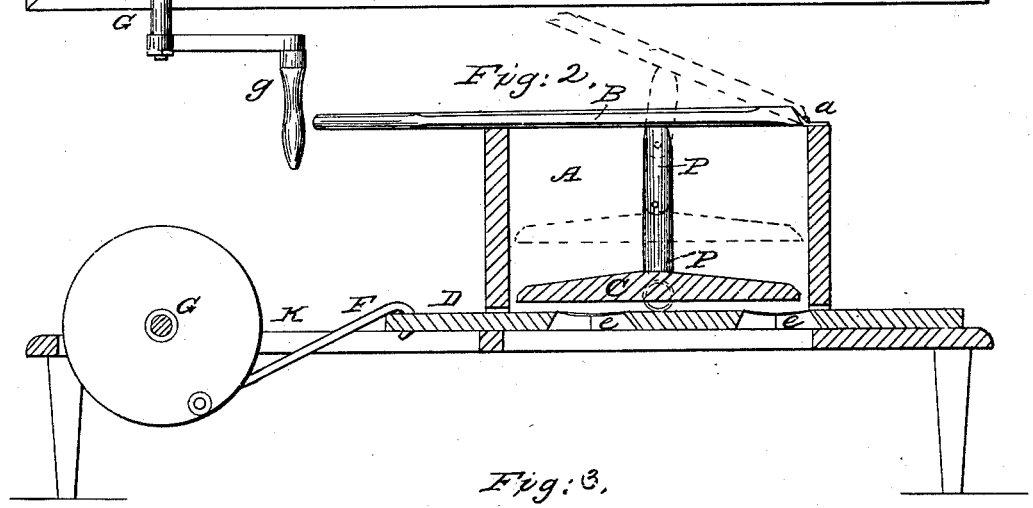
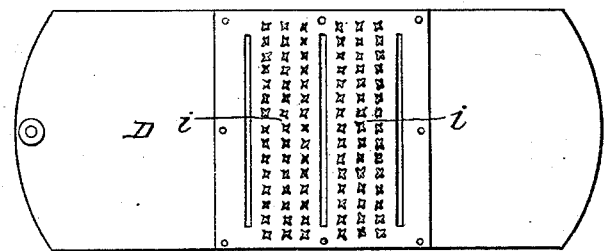
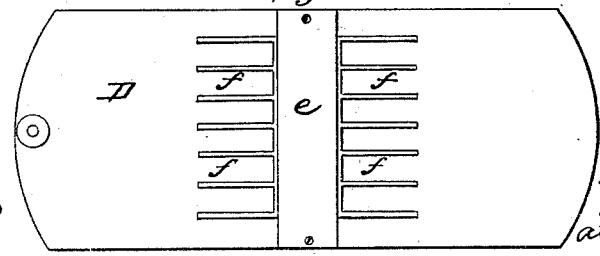

UNITED STATES PATENT OFFICE.

WM. H. TRISSLER, OF LIMA, INDIANA.

FRUIT AND VEGETABLE CUTTER.

Specification of Letters Patent No. 28,419, dated May 22, 1860.

*To all whom it may concern:*

Be it known that I, W. H. TRISSLER, of Lima, in the county of Lagrange and State of Indiana, have invented a new and Improved Machine for Cutting Fruit, Vegetables, &c., into Minute Portions; and I do hereby declare that the following is a full and exact description thereof, reference being had to the accompanying drawings, which form a part of this specification, in which—

Figure 1, is a top view of my said invention; Fig. 2, a longitudinal section in the line $x$, $x$, of Fig. 1; and Figs. 3, and 4, are modified forms of the cutter-plate D, which is one of the principal features of my improved fruit and vegetable cutter.

My fruit and vegetable cutter consists mainly of a rectangular box A, which has a sliding-bottom D, that is transversely slitted and armed with cutting blades $e$, $e$. At the same time the said box has a follower C, working freely within the same, which is combined with a jointed hand-lever B, in such a manner, that, while the operator with one hand can impart a reciprocating motion to the cutting bottom of said box, with his other hand he can bear down upon the lever B, and thereby cause the follower C, to press the fruit or vegetables, within said box, with any desired degree of force against the cutting bottom of the same for the purpose of facilitating its cutting action upon the said contents of the box, a reciprocating motion being imparted the sliding cutter-bottom D, of said box, through the medium of a pitman and crank-shaft, combined with each other and with the supporting bench K, in the manner represented in the drawings.

The cutting edges of the blades $e$, $e$, are curved upward to such a degree that they will freely take hold of the fruit, vegetables, &c., that may be placed within the box of the machine to be operated upon; and should the said cutters, from any cause, fail to operate upon the contents of said box as rapidly as the operator may desire, he can readily increase the performance of the cutters by pressing with his left hand at intervals upon the follower C, through the medium of the hand-lever B. It will therefore be perceived that my improved fruit and vegetable cutter is adapted to the strength of a child or to that of a strong man.

The follower C, should fit loosely within the hopper-box A; the end $a$, of the hand-lever B, is pivoted to the edge of the front side of the box, and the follower C, is jointed to the said lever through the medium of the blocks P, P, in the manner represented in Fig. 2.

The hopper-box A, is placed over an opening in an oblong supporting bench K, and is firmly secured to the lateral edges of said opening. The sliding bottom D, of said hopper-box, rests upon rollers, or smooth ways, and works freely back and forth through openings at the base of each end of the box, as shown in Fig. 2. The operating crank-shaft G, works in the elongated journal-box $h$; and the pitman F, which connects the front end of the sliding-bottom D, to the crank on the inner end of said shaft, works in a longitudinal slot in the bench K, as shown in the drawings.

The hand-lever B, should extend back far enough to enable the operator to easily take hold of it with one hand while his other hand has hold of the handle $g$, of the crank at the outer end of the crank-shaft G.

Fig. 3, of the accompanying drawings, represents a sliding box-bottom D, whose transverse slits are covered with grater-plates $i$, $i$; and Fig. 4, represents a box-bottom D, whose central slit is covered with a raised cutting-blade $e$, while at the same time a series of short spur-cutters $f$, $f$, rise from the face of said bottom on each side of its central slit. The former of said bottoms, when reciprocated beneath the hopper-box A, will perform the functions of a grater; and the latter will cut the contents of said box into much smaller pieces than can be accomplished by the action of the cutters represented as combined with the box-bottom in Figs. 1, and 2, of the drawings.

When in a frozen state, meat may also be placed within the hopper-box of my improved fruit and vegetable cutter, and be successfully operated upon by the cutters thereof.

Having thus fully described my improved fruit and vegetable cutter, what I claim therein as my invention and desire to secure by Letters Patent, is—

The arrangement of the hopper-box A, the sliding cutter-bottom D, the follower C, the hand-lever B, the pitman F, and the crank-shaft G, with each other and with the supporting-bench K, in the manner and for the purpose herein set forth.

The above specification of my improved fruit and vegetable cutter, signed and witnessed this 10th day of February, 1860.

W. H. TRISSLER.

Witnesses:
THOMAS J. SPAULDING,
A. C. VAN OMMA.